April 14, 1936.  J. A. OLSON  2,037,144
SHAFT SEAL
Filed May 1, 1933

Inventor
JOHN A. OLSON
By Richey & Watts
Attorneys

Patented Apr. 14, 1936

2,037,144

UNITED STATES PATENT OFFICE 2,037,144

SHAFT SEAL

John A. Olson, Cleveland, Ohio, assignor to Ruth M. Olson, Cleveland, Ohio

Application May 1, 1933, Serial No. 668,720

3 Claims. (Cl. 286—7)

This invention relates to seals for rotary shafts of the type that operate for a portion of their length in fluid. The seal is intended to prevent the escape of fluid between the shaft and its bearings or the fixed part in which it rotates. A seal of the general type described herein is disclosed in my prior application Serial No. 619,191, filed June 25, 1932.

It is among the objects of my invention to provide a seal for rotary shafts which will remain leak proof under severe operating conditions and which will require a minimum amount of service and attention. Another object of my invention is to provide a seal of this character which can be economically manufactured and installed. Another object is to provide a seal in which there will be very little wear on the packing material employed, the seal being made between metallic surfaces. Another object is to provide a seal for rotary shafts which will remain leak proof regardless of limited endwise movement or vibration of the shaft. A further object is to provide a seal embodying metallic sealing surfaces and which can be easily substituted for the ordinary type of packing nut.

Figure 1:
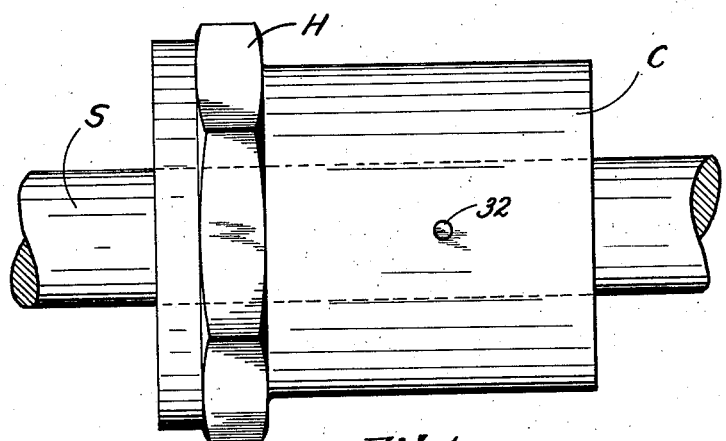
Figure 2:
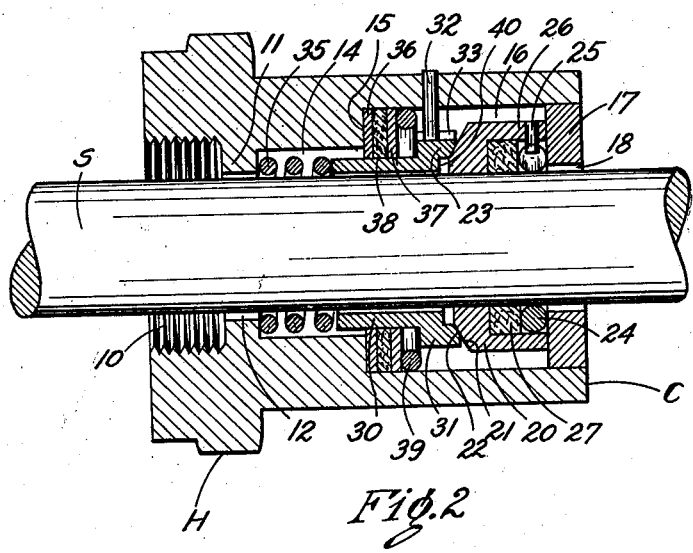

Further objects and advantages of my invention will become apparent from the following description of a preferred form thereof, reference being made to the accompanying drawing, in which Figure 1 is a plan view of a seal made according to my invention; Fig. 2 is a longitudinal section through the seal illustrated in Fig. 1.

In the drawing, a preferred form of my shaft seal is illustrated in conjunction with a shaft S and a casing C through which the shaft extends. The seal is adapted particularly to prevent fluid from flowing along the shaft within the casing from left to right as illustrated in the drawing. The type of seal illustrated herein is particularly adapted for use in connection with the shafts of water pumps of internal combustion engines. In such an installation, the impeller would be secured to the left hand end of the shaft S, while the pump might be driven by means of a pulley or other convenient arrangement secured to the right hand end of the shaft.

The seal illustrated herein is readily adapted to be substituted for the ordinary packing nut which is customarily installed on the water pump shafts of motor cars. To this end, the casing C is provided with a hexagonal portion H and with an internally threaded opening 10 at one end, the threads being arranged to cooperate with the usual threaded portion of the water pump casing (not shown). The threaded opening 10 terminates in an inwardly projecting flange 11, the internal diameter of the flange being slightly greater than the external diameter of the shaft to provide a small amount of clearance, as indicated at 12. Beyond the flange 11, the internal diameter of the intermediate portion of the casing is enlarged slightly as indicated at 14 and the portion 14 terminates in a shoulder 15. The remaining portion of the casing consists of an enlarged chamber 16 in which the sealing mechanism may be disposed. The chamber 16 may be closed by an apertured disk 17 pressed into the end of the chamber. The diameter of the opening 18 in the disk 17 is substantially the same as the internal diameter of the flange 11, thus leaving some clearance around the shaft S at this point.

To prevent the passage of fluid within the casing and along the shaft, I preferably provide a cup shaped sealing ring 20 which is mounted to rotate with the shaft and which is provided with a beveled sealing surface 21 adapted to engage the complementary beveled sealing surface 22 of the stationary sealing bushing 23. The ring 20 may be driven with the shaft by means of a split spring collar 24 which resiliently grips the shaft and which drives the ring by means of a pin 25 projecting through the flange 26 of the ring 20 and having its end disposed between the ends of the split collar. The collar 24 also functions to retain the packing material 27 within the flange of the sealing ring. The entire sealing ring assembly is prevented from being forced out of the casing (to the right as shown in the drawing) by the annular disk 17.

The stationary sealing bushing 23 comprises a sleeve portion 30 which loosely embraces the shaft, and an offset annular flange 31 on the end of which the beveled sealing surface 22 is formed. The bushing is held against rotation by means of a pin 32 extending through the wall of the casing and engaging a slot 33 in the flange 31. In order to hold the bushing in sealing engagement with the sealing ring, I preferably provide a coil spring 35 which acts between the internal flange 11 of the casing and the end of the sleeve 30.

To prevent fluid from passing around the outside of the bushing 23 and the sealing ring 20 and then out of the casing, and at the same time to support the bushing for a limited amount of endwise movement to compensate for any longitudinal movement or vibration of the shaft, I have provided a packing means comprising a pair of metallic washers 36 and 37 having a washer 38 of packing material disposed between them. The packing washer 38 makes a leak proof joint with the internal wall of the chamber 16 of the casing and makes a sliding leak proof fit with the exterior of the sleeve 30. The three washers are held in place by a resilient ring 39 which engages the washer 37 and by the shoulder 15 which engages the washer 36. By this arrangement, the sleeve is properly supported and the packing washer 38 is prevented from being warped or otherwise distorted by the two metallic washers which surround it.

It will be seen that any fluid traveling around the bushing will be prevented from reaching the enlarged chamber 16 by means of the packing washer 38 and the associated metallic washers, while any fluid which may travel along the shaft within the sleeve 30 and into the small annular chamber 40 will be prevented from reaching the chamber 16 by the cooperating sealing surfaces of the bushing and the sealing ring. Furthermore, the fluid which may reach the annular chamber 40 will be prevented from traveling along the shaft within the sealing ring by means of the packing material 27. By reason of the spring 35 and the slidable support for the bushing, the cooperating sealing surfaces will always be mounted in proper sealing engagement regardless of the limited endwise movement or vibration of the shaft S, and sufficient fluid will reach the annular chamber 40 to lubricate the surfaces properly.

From the foregoing description of a preferred form of my invention, it will be seen that I have provided a simple and durable seal which will permanently prevent leakage between the rotary shaft and the casing. In my seal the wear will be taken between cooperating metallic surfaces so that the seal will have a long life and will require a minimum amount of service and attention. Because of its simple construction, my seal can be economically manufactured and installed. Furthermore, my seal can be readily substituted for the ordinary packing nut by merely removing the nut and screwing the casing on in place of the packing nut.

In the present application, I have described only a preferred form of my invention. Changes and modifications therein will be apparent to those skilled in the art, all without departing from the spirit of my invention. Accordingly, it is to be understood that my patent is not limited by the specific disclosure herein or in any manner other than by the scope of the appended claims when given that range of equivalents to which they may be entitled.

I claim:

1. In a sealing device, the combination of a rotatable shaft, a casing surrounding the shaft, said casing having an internally threaded opening terminating in an inwardly projecting flange, an intermediate portion, and an enlarged end portion, and means within said casing for creating a seal between said casing and said shaft comprising a cup shaped sealing ring carried by the shaft and rotatable therewith and having a beveled sealing surface, packing material within said sealing ring and engaging the shaft, a sealing bushing adapted to surround said shaft and having a sleeve portion and a beveled flange adapted to cooperate with the beveled surface of the sealing ring, means for preventing the bushing from rotating with respect to the casing while allowing longitudinal movement of the bushing, packing means within the enlarged portion of the casing and slidably engaging said sleeve portion, and a spring acting between said inwardly projecting flange and the end of said sleeve portion for urging said bushing into sealing engagement with said sealing ring.

2. A shaft seal comprising a housing apertured to receive a shaft, a shoulder formed within the housing, packing juxtaposed to the shoulder, a sleeve within the housing and apertured to receive the shaft, a circumferential shoulder on the sleeve, said sleeve being arranged with said shoulder juxtaposed to said packing, the shoulders being arranged with the packing therebetween, means for holding the sleeve against rotation relative to the housing, a collar apertured to receive the shaft, packing means between the collar and the shaft, means for carrying the collar in rotation with the shaft, said collar and said sleeve being juxtaposed, said collar being rotatable relative to the sleeve, there being a fluid seal at the engaging faces of the sleeve and collar, means for preventing longitudinal movement of the collar relative to the shaft in one direction, spring means arranged to press the sleeve against the collar.

3. In a sealing device, the combination of a rotatable shaft, a casing surrounding the shaft, said casing having an inwardly projecting flange, an intermediate portion, and an enlarged end portion spaced from said flange, and means within said casing for creating a seal between said casing and said shaft comprising a sealing ring carried by the shaft and rotatable therewith and having a sealing surface, packing material between said sealing ring and said shaft, a sealing bushing adapted to surround said shaft and having a sleeve portion and a flange adapted to cooperate with the sealing surface of the sealing ring, means for preventing the bushing from rotating with respect to the casing while allowing longitudinal movement of the bushing, packing means within the enlarged portion of the casing and slidably engaging said sleeve portion, and a spring acting between said inwardly projecting flange and the end of said sleeve portion for urging said bushing into sealing engagement with said sealing ring.

JOHN A. OLSON.